(12) United States Patent
Seastrom (10) Patent No.: US 7,090,302 B1
(45) Date of Patent: Aug. 15, 2006

(54) SUPPORTING APPARATUS FOR ARTICLES (76) Inventor: Bernard J. Seastrom, P.O. Box. 335 Main Office, Shrewsbury, MA (US) 01545

( * ) Notice: Subject to any disclaimer, the term of this patent is extended or adjusted under 35 U.S.C. 154(b) by 0 days.

(21) Appl. No.: 11/248,842

(22) Filed: Oct. 12, 2005

Related U.S. Application Data

(62) Division of application No. 10/455,211, filed on Jun. 5, 2003, now Pat. No. 6,957,854.

(51) Int. Cl.
*A47B 97/00* (2006.01)
(52) U.S. Cl. .................................................. 297/463.1
(58) Field of Classification Search ................ 403/299, 403/362, 373, 110; 297/195.1, 463.1, 391, 297/410; 411/366.1
See application file for complete search history.

(56) References Cited

U.S. PATENT DOCUMENTS

| 456,391 | A | | 7/1891 | Andrus | |
|---|---|---|---|---|---|
| 1,028,795 | A | * | 6/1912 | Steinhouse et al. | 411/366.1 |
| 1,523,963 | A | | 1/1925 | Andrus | |
| 2,339,515 | A | * | 1/1944 | Parcher | 602/20 |
| 5,544,938 | A | * | 8/1996 | Saul et al. | 297/248 |
| 5,704,080 | A | | 1/1998 | Kuhne | |
| 5,722,718 | A | * | 3/1998 | Still et al. | 297/215.15 |
| 5,802,680 | A | * | 9/1998 | Postelwait | 24/135 R |

\* cited by examiner

*Primary Examiner*—Milton Nelson, Jr.
(74) *Attorney, Agent, or Firm*—Blodgett & Blodgett, P.C.

(57) ABSTRACT

An article supporting device for use in a motor vehicle that is equipped with a pair of headrest supporting sockets in the backrest and a headrest removably mounted in the sockets. The article supporting device includes a horizontal supporting component, an article supporting fixture fixed to the front end of the horizontal component, and a pair of spaced posts fixed to the rear end of the horizontal component.

10 Claims, 6 Drawing Sheets

SUPPORTING APPARATUS FOR ARTICLES

CROSS-REFERENCE TO RELATED APPLICATIONS

This is a DIV of Ser. No. 10/455,211 filed Jun. 5, 2003 now U.S. Pat. No. 6,957,854.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed generally to an article supporting device for use within a motor vehicle for supporting a variety of articles. The invention is specifically directed to an article supporting device which is removably attachable to the headrest sockets typically found in modern motor vehicles, and in which the headrest is removable from the sockets, which is typically the case.

Many types of article supporting devices have been developed for use in motor vehicles. Most supporting devices are designed for supporting articles which have a strap, such as purses, shopping bags, camera cases, etc. Prior art article supporting devices are typically anchored or connected to the passenger's seat so that the article to be supported is in easy access to the driver. The most common type of article supporting device is supported on the posts of the headrest that is part of most modern motor vehicles. The holder includes a hook or loop that is anchored to the posts of the headrest. One particular type of holder includes a tab at one end of the holder, which is rectangular in cross-section for insertion into the single rectangular headrest supporting socket for older motor vehicles which are so equipped. The opposite end of the holder is supported on the dashboard of the motor vehicle.

Prior art supporting devices for use in motor vehicles are specifically designed for supporting a particular type of article and, therefore, have limited utility. The prior art article supporting devices are also specifically adapted for use with particular seat and headrest configurations. For example, for motor vehicles which have two headrest sockets at the upper end of the backrest, there is a wide variation of center to center distance between the sockets from one make or model of motor vehicle to another. There are also variations in the size of the sockets. These and other difficulties experienced with the prior art article supporting devices for use in motor vehicles have been obviated by the present invention.

It is, therefore, a principal object of the invention to provide an article supporting device for a motor vehicle that is versatile and not limited to being a support for a particular type of article.

A further object of the invention is the provision of an article supporting device for a motor vehicle that utilizes the headrest sockets of the motor vehicle and is adaptable to variations in socket sizes and socket spacings.

Another object of the invention is the provision of an article supporting device for a motor vehicle that is simple in construction and easy to use.

With these and other objects in view, as will be apparent to those skilled in the art, the invention resides in the combination of parts set forth in the specification and covered by the claims appended hereto.

BRIEF SUMMARY OF THE INVENTION

In general, the invention consists of an article supporting device for use in a motor vehicle that is equipped with a pair of headrest supporting sockets in the backrest and a headrest removably mounted in the sockets. The article supporting device includes a support arm component, an article supporting fixture connected to one end of the support arm component, and a pair of spaced posts fixed to the opposite ends of the support arm component. More specifically, the support arm component comprises a pair of spaced arms which are connected at their outer ends. The inner end of one arm is connected to one post. The inner end of the other arm is connected to the other post.

BRIEF DESCRIPTION OF THE DRAWINGS

The character of the invention, however, may be understood best by reference to one of its structural forms, illustrated by the accompanying drawings, in which.

DETAILED DESCRIPTION OF THE INVENTION

Referring to FIGS. 1–5, the preferred article supporting device of the present invention is generally indicated by the reference numeral 10. Article supporting device 10 includes a horizontal component, generally indicated by the reference numeral 11, a vertical component, generally indicated by the reference numeral 15, and a fixture in the form of a horizontal tab 18. The horizontal component 11 is a generally v-shaped integral deformable flat metal strip having a horizontal first arm, generally indicated by the reference numeral 20, and a horizontal second arm, generally indicated by the reference numeral 22. The arms 20 and 22 are connected at their front ends by a bight 24. The tab 18 is fixed to the bight 24 and extends rearwardly therefrom. Each arm 20 and 22 has a 90° twist at an intermediate point 30 to divide the arm into a forward portion 26 and a rearward portion 28. The major dimension of the rearward portion 28 of each arm 20 and 22 is typically horizontal, and the major dimension of the forward portion 26 of each arm 20 and 22 is typically vertical.

The vertical component 15 includes a first post, generally indicated by the reference numeral 14, fixed to the rearward end of the arm 20, and a second post, generally indicated by the reference numeral 16, fixed to the rearward end of the arm 22. Each post 14 and 16 has an upper portion 34, a lower portion 36 and an intermediate portion 38. Each post 14 and 16 is a tubular cylinder. The intermediate portion 38 has a smaller diameter than the upper portion 34, and the lower portion 36 has a smaller diameter than the intermediate portion 38. This enables the posts 14 and 16 to fit into headrest sockets of different diameters while maintaining a relatively snug fit.

Figure 5:
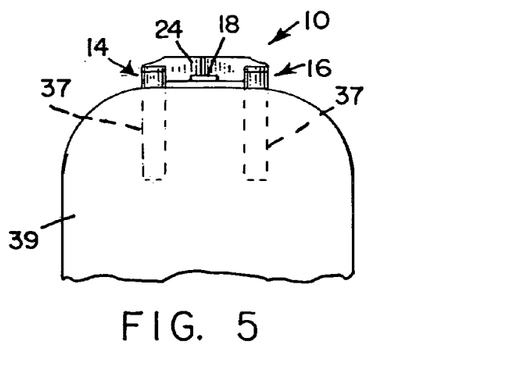
FIG. 5 is a rear elevational view of the supporting device of FIG. 4 applied to the backrest portion of a seat of an automobile.

Referring to FIG. 5, the article supporting device 10 is shown applied to the seat of an automobile. The seat of the automobile, indicated by the reference numeral 39, has a pair of sockets 37 at the top of the seat for receiving a pair of posts of a conventional headrest, not shown. With the headrest removed from the seat 39, the posts 14 and 16 are inserted into the sockets 37. Due to the deformable nature of the supporting device 10, the posts 14 and 16 can be separated or drawn together for insertion into sockets having different spacings. The rear portions 28 of the arms 20 and 22 can be bent upwardly or downwardly to change the vertical position of the tab 18 relative to the top of the seat 39.

Figure 1:
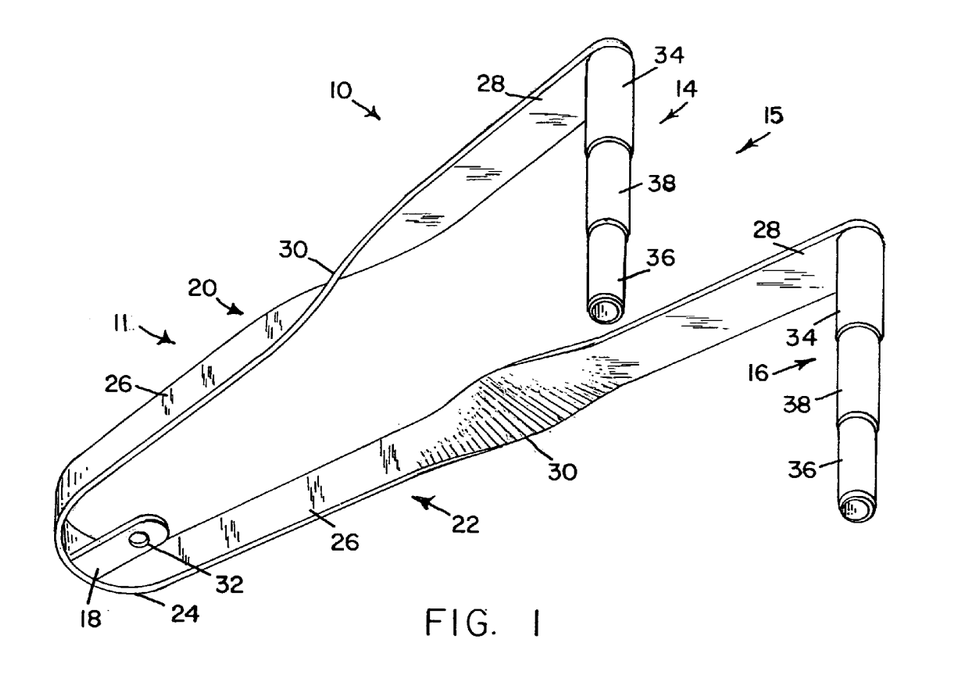
FIG. 1 is an isometric view of a supporting device for articles embodying the principles of the present invention.
Figure 2:
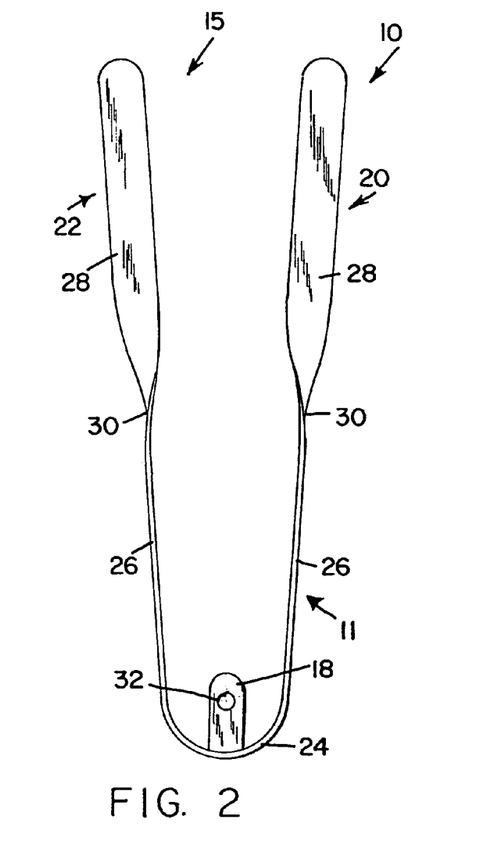
FIG. 2 is a top plan view of the supporting device.
Figure 3:
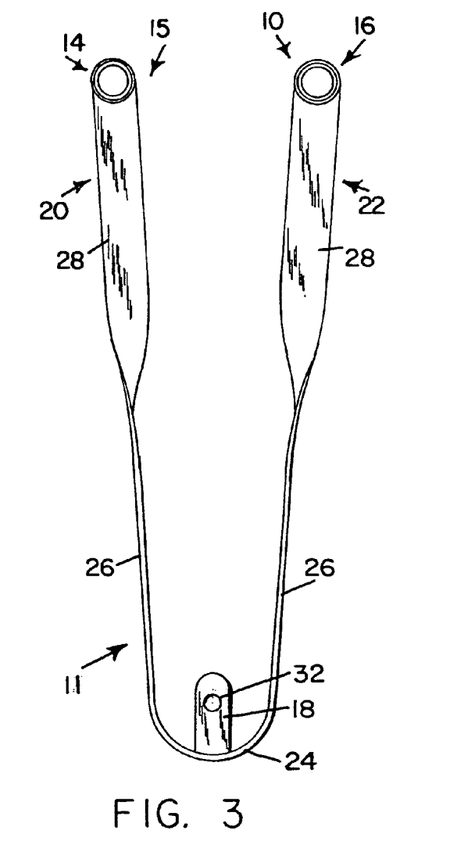
FIG. 3 is a bottom plan view of the supporting device.
Figure 4:
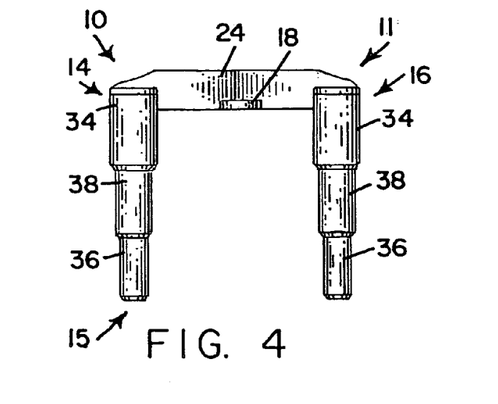
FIG. 4 is a rear elevational view of the supporting device.

The tab 18 can be used to support a wide range of articles or article containers. For example, most cameras have a threaded socket for receiving a bolt for mounting on a tripod. The camera can be supported on the arms 20 and 22 and a bolt extended upwardly through the aperture 32 and threaded into the threaded mounting socket of the camera. A beverage container having a threaded aperture can likewise be supported on the arms 20 and 22 and secured by a bolt.

Figure 6:
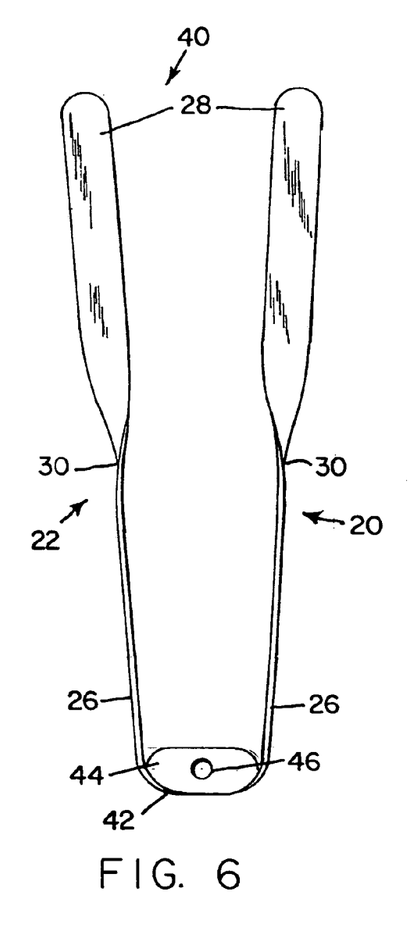
FIG. 6 is a top plan view of a first modified supporting device.

Referring to FIG. 6, a first modified article supporting device is generally indicated by the reference numeral 40. Article supporting device 40 is identical to article supporting device 10 with respect to arms 20 and 22, and posts 14 and 16. Supporting device 40 differs from supporting device 10 in that there is no tab 18, and a bight, indicated by the reference numeral 42, which connects the two arms, is twisted rearwardly 90° so that the large dimension of the bight is horizontal to form an integral tab 44. Tab 44 has an aperture 46 and functions as a fixture for securing articles or containers for articles.

Figure 7:
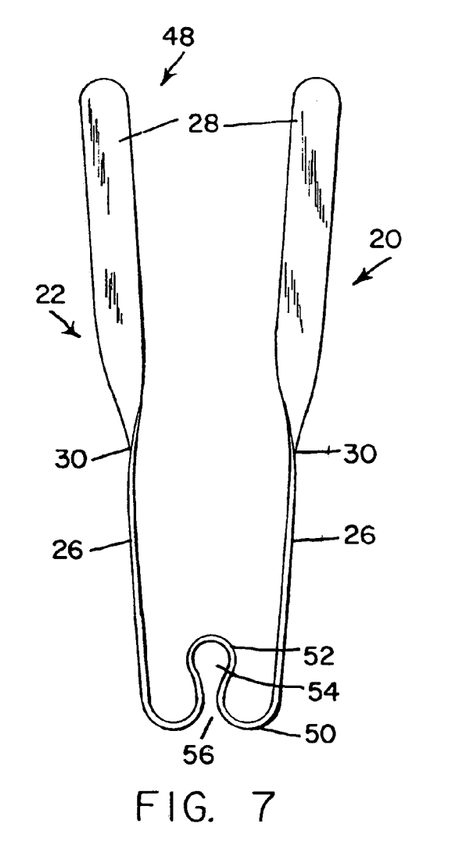
FIG. 7 is a top plan view of a second modified supporting device.

Referring to FIG. 7, a second modified article supporting device is generally indicated by the reference numeral 48. Article supporting device 48 is identical to article supporting device 10 with respect to arms 20 and 22, and posts 14 and 16. However, a bight, indicated by the reference numeral 48, which connects the arms 20 and 22, is folded rearwardly to form a loop 52 that defines an aperture 54. In a variation of embodiment 48, the article supporting device is made of a resiliently deformable material so that loop 52 functions as a spring clip, thereby enabling an article to be forced into the aperture 54 through an opening 56 at the front of the loop.

Figure 8:
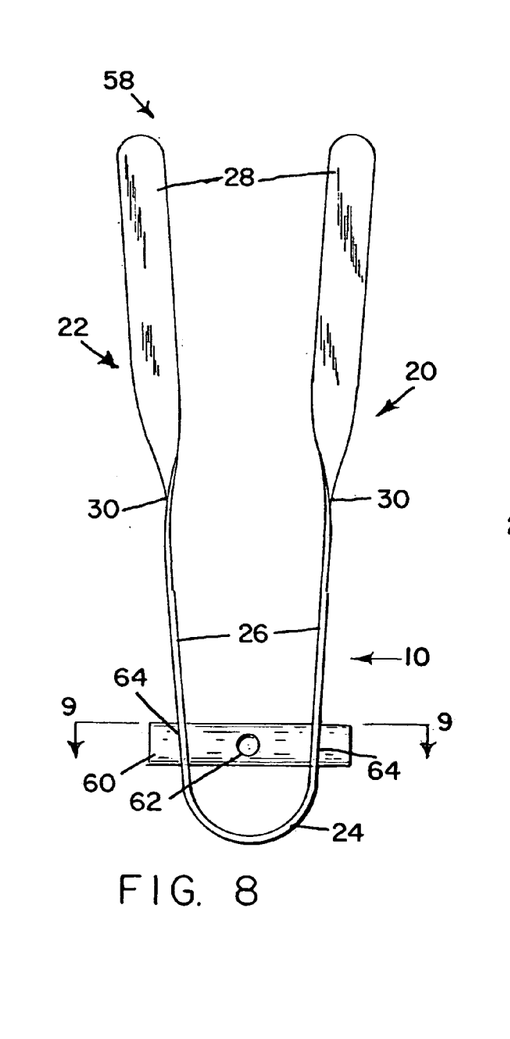
FIG. 8 is a top plan view of a third modified supporting device.
Figure 9:
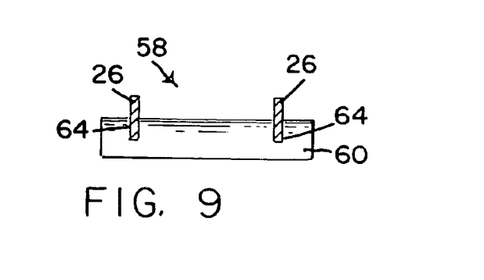
FIG. 9 is a vertical cross-sectional view taken along line 9—9 of FIG. 7 and looking in the direction of those arrows.
Figure 10:
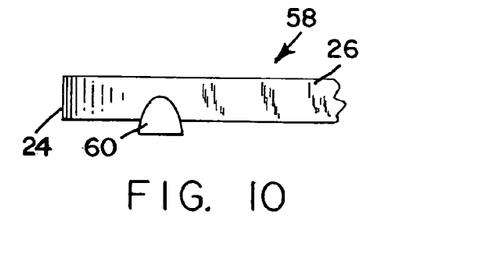
FIG. 10 is a side elevational view looking in the direction of arrow 10 of FIG. 8, with portions broken away.

Referring to FIGS. 8–10, a third modified article supporting device is generally indicated by the reference numeral 58. Article supporting device 58 is identical to article supporting device 10 with respect to arms 20 and 22, bight 24, and posts 14 and 16. Supporting device 58 has a fixture in the form of a bar 60 connected to the forward portions 26 of the arms 20 and 22. Bar 60 has an aperture 62 and extends transversely to arms 20 and 22. Bar 60 also has a pair of spaced grooves 64 for receiving the arms 20 and 22. Bar 60 can be fixed to the arms 20 and 22, eg by welding. In a variation of embodiment 58, the supporting device 58 is made of resiliently deformable material, and the slots 64 are spaced at a distance which is less or greater than the distance between the arms 20 and 22. The arms 20 and 22 are forced together or separated, as the case may be, into vertical alignment with the slots 64 and inserted into the slots. The resiliency of the supporting device forces the arms against the sides of the slots 64 for maintaining the bar 60 on the arms 20 and 22.

Figure 11:
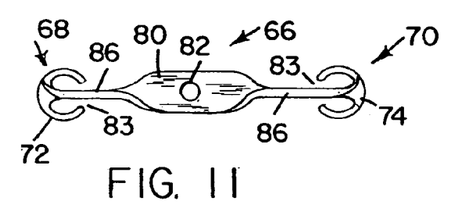
FIG. 11 is a top plan view of a fourth modified supporting device.
Figure 12:
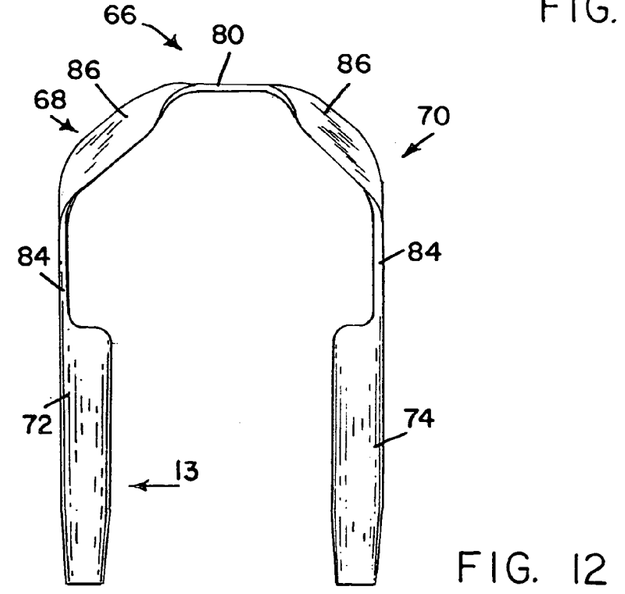
FIG. 12 is a front elevational view thereof.
Figure 13:
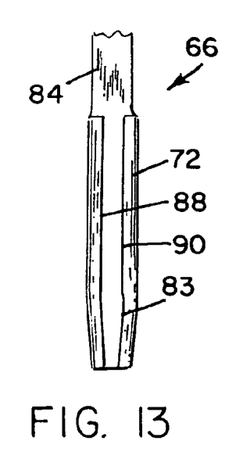
FIG. 13 is a side elevational view looking in the direction of the arrow 13 of FIG. 12.
Figure 14:
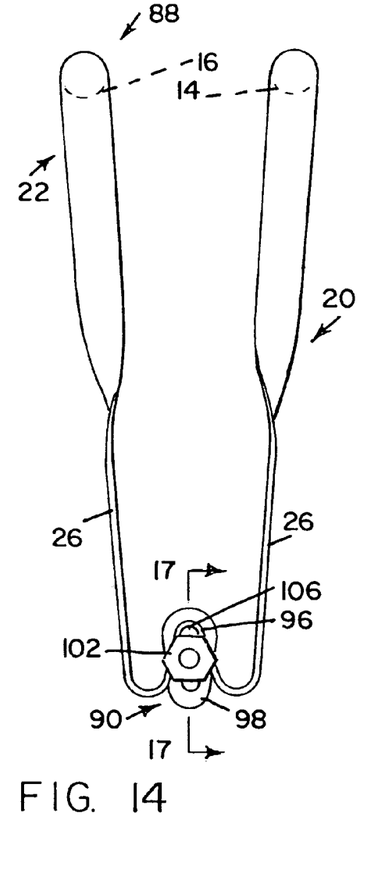
FIG. 14 is a top plan view of a fifth modified supporting device.
Figure 15:
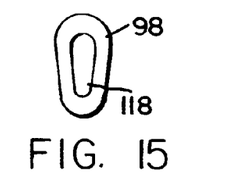
FIG. 15 is a top plan view of one member of the fixture which forms part of the fifth modified supporting device.
Figure 16:
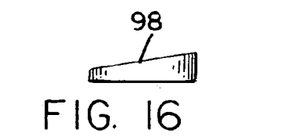
FIG. 16 is a right side elevational view of the member of FIG. 15.

Referring to FIGS. 11–13, a fourth modified article supporting device is generally indicated by the reference numeral 66. Article supporting device 66 includes a first arm, generally indicated by the reference numeral 68, a second arm, generally indicated by the reference numeral 70, a first vertical tubular post 72 connected to the lower end of arm 68, and a second vertical tubular post 74 connected to the lower end of arm 70. The upper ends of arms 68 and 70 are connected to a fixture 80 which has an aperture 82. Each post 72 and 74 has a vertical slot 83 so that the post is generally c-shaped in horizonal cross-section. Each arm 68 is shown in a vertical plane and includes a lower portion 84 connected to its respective post and an upper portion 86 connected to the fixture 80. Arms 68 and 70, posts 72 and 74, and fixture 80 are formed from a single flat strip. The ends of the strip which are formed into the posts 72 and 74 are significantly wider than the rest of the strip and bent into a cylindrical tubular shape as shown in FIGS. 11–13. The lower ends of posts 72 and 74 are tapered for eased insertion. The upper portion 86 of each arm 68 and 70 is twisted 90° relative to its lower portion 84 and to the fixture 80.

The strip is resiliently deformable within a bending limit. The strip is initially formed beyond its bending limit to assume the shape of the article supporting device 66 as shown in FIGS. 11–13. Each component of the device 66 has a normal functional position and will return to this position after being bent, provided that the bending is within the bending limit of the article supporting device 66. The resilient bending factor of device 66 enables posts 72 and 74 to be separated or drawn together to accommodate headrest sockets of different spacings. The resilient bending factor of the article supporting device 66 also enables the posts 72 and 74 to be inserted into headrest sockets of different diameters. The posts 72 and 74 have an outer dimension equal to the largest headrest sockets. When the posts 72 and 74 are forcefully inserted into the headrest sockets which have a smaller diameter, the posts are subjected to an outer pressure which causes the opposed edges 88 and 90 of the opening 83 to be forced toward each other to reduce the outer dimensions of the posts. This also causes the posts 72 and 74 to fit snugly within the headrest sockets. When the posts are removed from the headrest sockets, they will return to their normal size. It is also possible to use a metal strip which has no resiliency and can be bent or adjusted into any desired fixed position. This is also true for all embodiments of the invention. A degree of resiliency is desirable in cases where a spring effect is desired for a particular component of the device.

If desired, the article supporting device 66 can be formed of a single integral strip to include the tab 80 as shown in FIGS. 11 and 12, for folding the area between arms 68 and 70 into a loop.

Referring to FIGS. 14–17, a fifth modified article supporting device is generally indicated by the reference numeral 88. Article supporting device 88 includes the same arms 20 and 22 and posts 14 and 16 which form part of the article supporting device 10. A fixture, generally indicated by the reference numeral 90, is fixed to the forward ends of arms 20 and 22.

Fixture 90 has a first rearward end, generally indicated by the reference numeral 92, and a second forward end, generally indicated by the reference numeral 94. Fixture 90 includes a first member 96, and a second member 98, held together by a fastener, generally indicated by the reference numeral 99. Fastener 99 includes a bolt, generally indicated by the reference numeral 100, and a nut 102. Bolt 100 has a head portion 101 and a shank portion 104.

Figure 17:
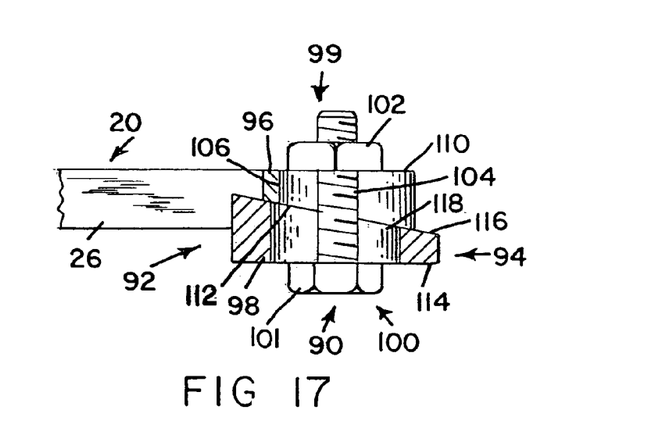
FIG. 17 is a vertical cross-sectional view of the fixture, taken along line 17—17 of FIG. 16 and looking the direction of the arrows.

The first member 96 is integral with the forward ends of arms 20 and 22 and can be in the shape of a loop that extends rearwardly from the forward ends of arms 20 and 22. The first member 96 has an upper surface 110 and a lower surface 112, which is at an angle to the upper surface 110 and slopes downwardly toward the first, or rearward, end 92 of the fixture. The first member 96 has an opening 106 that extends from the upper surface 110 to the lower surface 112.

The second member 98 has a lower surface 114 that is parallel to the upper surface 110, and an upper surface 116 that extends at an angle to the lower surface 114 and abuts the lower surface 112. The second member 98 has an aperture 118 extending from the upper surface 116 to the lower surface 114. The aperture 118 tapers from the first end 92 of the fixture, from a relatively large width to a relatively small width as shown most clearly in FIG. 15.

The fastener 99 includes a bolt, generally indicated by the reference numeral 100, and a nut 102. The bolt 100 has a head 101 that engages the lower surface 114, and a shank 104 that extends upwardly through the aperture 118 and opening 106. The nut 102 is threaded onto the shank 104 and engages the upper surface 110. When the nut 102 is tightened, the upper surface 116 is forced against the lower surface 112. The angle of the surfaces 116 and 112, relative to the surfaces 110 and 114, works in concert with the tightening of the nut 102 to help overcome the force of friction between the surfaces 116 and 112, to cause the member 98 to automatically slide toward the first end 92 of the fixture 90 relative to the first member 96 until the shank 104 reaches a point in the aperture 118 where it is snug.

A simpler version of the fixture 90 is to have the surfaces 112 and 116 parallel to the surfaces 110 and 114. In this version, the member 98 is manually adjusted relative to member 96 for movement toward the first end 92 until the shank 104 reaches a point in the aperture 118 where it is snug. Once this position is reached, the nut 102 is tightened on the bolt 100 to clamp the members 96 and 98 together.

The adjustability feature of the fixture enables bolts of different sizes to be used. For example, if a camera is to be supported on the fixture 90, a bolt having a specific shank diameter must be used to fit into the specific threaded bore of the camera. Any bolt having a shank diameter smaller than the largest width of the aperture 118 and larger than the smallest width of the aperture 118 can be used. For articles such as cameras which have a bolt receiving bore, the article functions as one element of the fastener 99. For other articles, the article is clamped between the nut 102 and the surface 110.

The spatial orientation of the members 96 and 98 is not limited to the example shown in FIGS. 14–17. The member 98 can be above the member 96 so that the lower surface 114 is the uppermost surface of the fixture and the upper surface 110 is the lowermost surface of the fixture. The entire fixture 88 can be rotated 90° so that the surfaces 110 and 114 are vertical.

What is claimed is:

1. A fixture for supporting an article, said fixture having a first end, a second end, and comprising:
    (a) a first member adapted to be fixed to a supporting structure, said first member having a first upper surface and a first lower surface, said first member having an opening extending from said first upper surface to said first lower surface;
    (b) a second member having a second lower surface, and a second upper surface parallel to and abutting said first lower surface, said second member having an aperture vertically aligned with said opening and extending from said second upper surface to said second lower surface, said aperture being elongated along an axis extending from the first end of said fixture to the second end of said fixture, said aperture tapering from a relatively large width adjacent the first end of said fixture to a relatively small width adjacent the second end of said fixture; and
    (c) a fastener having a first part for engaging said first upper surface, a second part for engaging said second lower surface and a threaded shank fixed to one of said first part and said second part for extending through said aperture and said opening and being threaded into the other of said first part and said second part, the thickness of said shank being less than the relatively large width of said aperture and at least equal to the relatively small width of said aperture, said second member being slidable relative to said first member along said axis toward the first end of said fixture so that the relatively small width portion of said aperture moves toward said shank until said shank is snug within said aperture.

2. The fixture as recited in claim 1, wherein said second lower surface is parallel to said first upper surface, and wherein each of said first lower surface and said second upper surface is at an angle to said first upper surface, and converging toward said first upper surface from the second end of said fixture to the first end of said fixture, the angle of said first lower surface relative to said first upper surface and the friction between said first lower surface and said second upper surface being such that tightening of said fastener to draw said first part toward said second part causes said second member to automatically slide relative to said first member along said axis toward the first end of said fixture.

3. A fixture for supporting an article and having a first axis and a second axis transverse to said first axis, said fixture comprising:
    (a) a first member adapted to be fixed to a supporting structure, said first member having a first upper surface substantially parallel to said first axis, a first lower surface at an acute angle to said first upper surface and said first axis, and a first inner surface facing said second axis and defining an opening extending along said second axis from said first upper surface to said first lower surface;
    (b) a second member having a second upper surface parallel to and abutting said first lower surface, a second lower surface substantially parallel to said first upper surface and said first axis, and a second inner surface facing said second axis and defining an aperture extending along said second axis from said second upper surface to said second lower surface, said aperture being aligned with said opening along said second axis; and (c) a fastener for applying a compressive force between said first upper surface and second lower surface along said second axis, said compressive force being sufficient to overcome the friction between said first lower surface and said second upper surface to cause said second member to slide relative to said first member along said first lower surface and said second upper surface toward said second axis, said fastener having a first part for engaging said first upper surface, a second part for engaging said second lower surface and a shank for extending loosely through said opening and said aperture along said second axis from said first part to said second part, said first inner surface and said second inner surface being adapted to converge toward said second axis when said first member is caused to move relative to said second member by said fastener to enable said first inner surface and second inner surface to engage said shank tightly.

4. The fixture as recited in claim 3, wherein said shank is threaded and forms with one of said first part and said second part a threaded bolt and the other of said first part and said second part is a nut adapted to be threaded onto said shank.

5. The fixture as recited in claim 3, wherein at least one of said opening and said aperture is elongated along said first axis and tapers gradually from a first relatively wide end to a second relatively narrow end that is no wider than the width of said shank, said second end being located to move toward said second axis when said first member moves relative to said second member as a result of the application of said compressive force along said second axis.

6. The fixture as recited in claim 3, wherein each of said aperture and said opening is elongated along said first axis and tapers gradually from a first relatively wide end to a second relatively narrow end that is no wider than the width of said shank, said second ends being situated to move toward each other and said second axis when said first member moves relative to second member as a result of the application of said compressive force along said second axis.

7. A fixture for connecting a first structure to a second structure, said fixture having a first axis and a second axis traverse to said first axis, said fixture comprising:

(a) a first member adapted to be fixed to said first structure, said first member having a first upper surface substantially parallel to said first axis, a first lower surface at an acute angle to said first upper surface and said first axis, and a first inner surface facing said second axis and defining an opening extending along said second axis from said first upper surface to said first lower surface;

(b) a second member having a second upper surface parallel to and abutting said first lower surface, a second lower surface substantially parallel to said first upper surface and said first axis, and a second inner surface facing said second axis and defining an aperture extending along said second axis from said second upper surface to said second lower surface, said aperture being aligned with said opening along said second axis; and (c) a fastener for connecting said second structure to said first member, said fastener being adapted for applying a compressive force between said first upper surface and second lower surface along said second axis said compressive force being sufficient to overcome the friction between said first lower surface and said second upper surface to cause said second member to slide relative to said first member along said first lower surface and said second upper surface toward said second axis, said fastener having a first part for engaging said first upper surface, a second part for engaging said second lower surface and a shank for extending loosely through said opening and said aperture along said second axis from said first part to said second part, said first inner surface and said second inner surface being adapted to converge toward said second axis when said first member is caused to move relative to said second member by said fastener to enable said first inner surface and second inner surface to engage said shank tightly.

8. The fixture as recited in claim 7, wherein said shank is threaded and forms with one of said first part and said second part a threaded bolt and the other of said first part and said second part is a nut adapted to be threaded onto said shank.

9. The fixture as recited in claim 7, wherein at least one of said opening and said aperture is elongated along said first axis and tapers gradually from a first relatively wide end to a second relatively narrow end that is no wider than the width of said shank, said second end being located to move toward said second axis when said first member moves relative to said second member as a result of the application of said compressive force along said second axis.

10. The fixture as recited in claim 7, wherein each of said aperture and said opening is elongated along said first axis and tapers gradually from a first relatively wide end to a second relatively narrow end that is no wider than the width of said shank, said second ends being situated to move toward each other and said second axis when said first member moves relative to second member as a result of the application of said compressive force along said second axis.

* * * * *